United States Patent [19]
Ellis et al.

[11] Patent Number: 5,098,335
[45] Date of Patent: Mar. 24, 1992

[54] PROCESSING ROLL ASSEMBLY

[75] Inventors: James S. Ellis; Julius A. Ellis, both of Gainesville, Ga.

[73] Assignee: Cantrell Machine Company, Inc, Gainesville, Ga.

[21] Appl. No.: 561,724

[22] Filed: Aug. 1, 1990

[51] Int. Cl.⁵ .............................................. A22B 5/16
[52] U.S. Cl. ................................... 452/111; 452/112
[58] Field of Search ............... 452/111, 112, 113, 114, 452/142

[56] References Cited

U.S. PATENT DOCUMENTS

| | | | |
|---|---|---|---|
| 3,406,425 | 10/1968 | Hill | 452/112 |
| 4,570,293 | 2/1986 | Harben, Jr. et al. | 452/111 |
| 4,799,292 | 1/1989 | Harben, III | 452/111 |

Primary Examiner—Willis Little
Attorney, Agent, or Firm—B. J. Powell

[57] ABSTRACT

A processing assembly for use in processing poultry parts by separating the parts into different portions comprising an elongate roll with helically extending teeth and a cover defining a recess therein for the discharge end of the roll with a size such that the discharge end of said roll is rotatably received in the recess and a depth such that the teeth on the discharge end of the roll extend a prescribed distance into the recess.

12 Claims, 4 Drawing Sheets

PROCESSING ROLL ASSEMBLY

BACKGROUND OF THE INVENTION

This invention relates generally to poultry processing apparatus and more particularly to poultry processing apparatus using helically toothed rolls to separate poultry parts.

It is common practice in the poultry processing industry to separate poultry parts using toothed rolls which have helically extending teeth therearound where the teeth on the two rolls drivingly intermesh to grip one portion of the poultry part therebetween and strip it from the other portion of the poultry part. One of the most common uses of such processing rolls is to remove the lining from the edible portion of the gizzard to produce an edible product. Another common use is to remove the stomach and intestine from the gizzard for further processing. Another common use is to remove the skin from a poultry part. Still another use is to remove the lungs and membranes from the heart.

All of the present processing roll assemblies suffer a common problem. This problem is the buildup of material around the rolls at the discharge end thereof which in turn causes high stressing of the rolls. The result of this increased stress is the premature failure of the roll itself, the increased wear on the bearings to reduce bearing life, and the overloading of the roll drive system. Thus, there is a need to prevent the buildup of the material around the discharge end of the rolls.

SUMMARY OF THE INVENTION

These and other problems and disadvantages associated with the prior art are overcome by the invention disclosed herein by providing a processing roll assembly in which a buildup of material around the discharge ends of the toothed rolls is prevented thereby extending the useful life of the assembly.

The apparatus of the invention includes a cover defining a recess therein having a size such that the discharge ends of a pair of the helically toothed processing rolls rotatably received therein and a depth such that the teeth on the discharge ends of the rolls extend a prescribed distance into said recess. The cover may be incorporated into a mounting adapted to rotatably mount the discharge ends of the pair of toothed processing rolls. The recess may be a pair of recesses which open into each other to permit the teeth on the rolls to intermesh in the recesses. The recess should be sized to closely conform to at least half of the roll periphery to insure no detrimental buildup of material around the discharge ends of the rolls.

These and other features and advantages of the invention will become more clearly understood upon consideration of the following detailed description and accompanying drawings wherein like characters of reference designate corresponding parts throughout the several view and in which:

Figure 1:
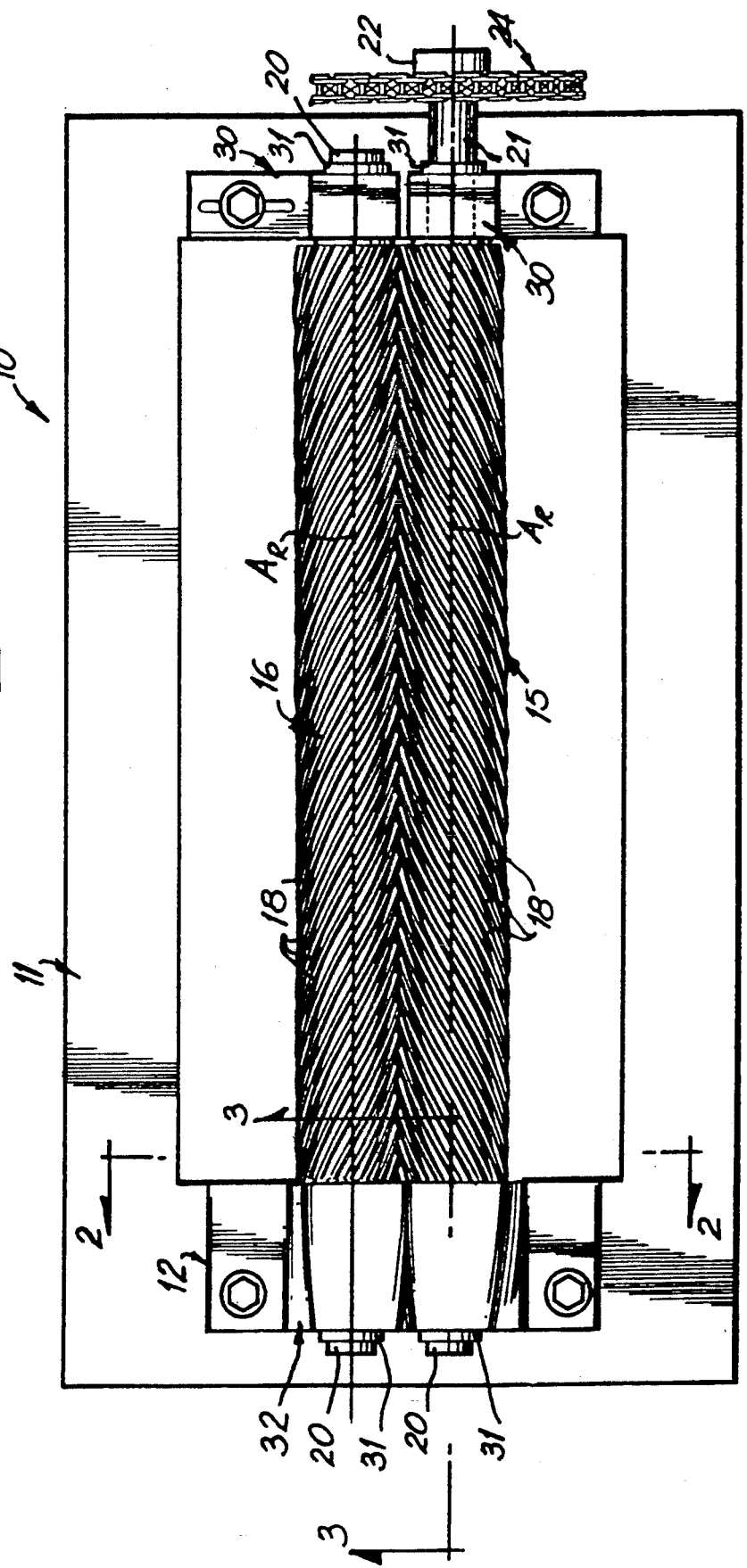
FIG. 1 is an top plan view of the processing roll assembly.

These figures and the following description disclose specific embodiments of the invention, however, it is to be understood that the inventive concept is not limited thereto since it can be embodied in other forms.

DETAILED DESCRIPTION OF ILLUSTRATIVE EMBODIMENTS

Referring to the drawings, the processing roll assembly 10 incorporating the invention is described as a general application to the separation of one portion of a poultry part from another. The specifics of the assembly 10 will be varied in accordance with the knowledge of those skilled in the art to accommodate different processing operations such as separation of the gizzard from the stomach and intestine, peeling of the lining from the gizzard, skinning poultry carcasses and parts, and cleaning of poultry hearts.

The processing roll assembly 10 includes a subframe 11 adapted for mounting on an appropriate base frame (not shown), a discharge end bearing assembly 12 mounted on one end of the subframe 11, a drive end bearing assembly 14 mounted on the opposite end of the subframe 11, and a pair of processing rolls 15 and 16 rotatably mounted between the bearing assemblies 12 and 14.

The processing rolls 15 and 16 have helically extending gear teeth 18 thereon which drivingly intermesh in a manner well known in the poultry processing art for these types of rolls. The teeth 18 typically grip the softer portions of the poultry part attached to the firmer portions of the poultry part and pull the softer portions down between the rolls while the relatively firmer portions remain on top of the rolls 15 and 16. This serves to pull the softest portions off of the firmer portions. The teeth 18 also serve to propel the firmer portion of the poultry part lengthwise of the rolls toward the discharge end 19 of the rolls 15 and 16. The particular shape and size of the teeth 18 varies depending on the application to which the rolls are being applied. For instance, rolls for separating the stomach and intestine from unopened gizzards and rolls for skinning carcasses and drumsticks typically have a diameter of about 1-3 inches with a pitch diameter of about 8-12 and a pressure angle of 14.5°-25°. Typically, rolls for peeling gizzards have diameters of about 0.5-1.5 inches with a pitch diameter of about 20-25 and a pressure angle of about 14.5°-35°. The inventive concept applies to all roll sizes and configurations used in the poultry processing art. For purposes of illustration only and not meant to be limiting, the rolls 14 and 15 illustrated have a diametrical pitch of about 12 and a pressure angle of 14.5°. The illustrated thread crest diameter $d_{TC}$ of the teeth 18 may be varied, however, the diameter shown is about 1.75 inches.

Figure 2:
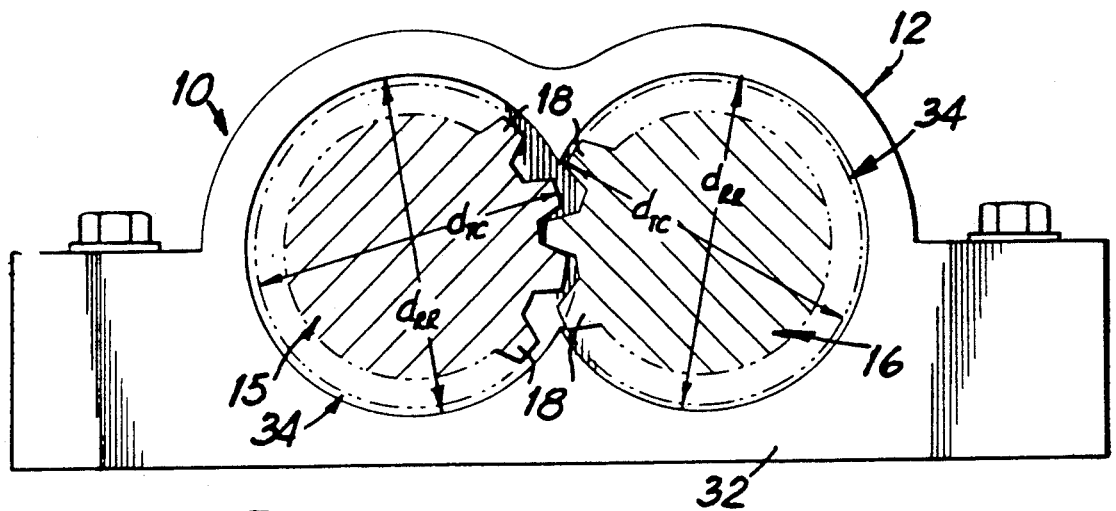
FIG. 2 is an enlarged cross-sectional view taken generally along line 2—2 in FIG. 1.
Figure 3:
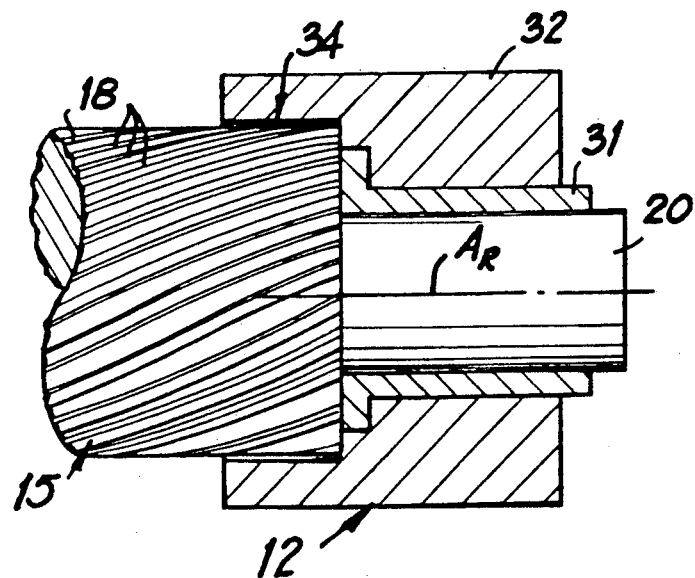
FIG. 3 is an enlarged cross-sectional view taken generally along line 3—3 in FIG. 1.

The driving roll 15 has a stub shaft 20 on the discharge end thereof as best seen in FIGS. 1 and 3 journalled in the discharge end bearing assembly 12 as will be explained. The opposite end of the driving roll 15 has a drive shaft extension 21 thereon that extends through the driving end bearing assembly 24 as best seen FIG. 2 to mount the driven sprocket 25 of an appropriate conventional chain and sprocket arrangement 26 thereon with a conventional drive unit (not shown). The driven roll 16, on the other hand, has stub shafts 20 on both ends of the roll.

The drive end bearing assembly 14 is conventional with a pair of bearing blocks 30, at least one of which is adjustably positioned on the subframe 11 in known manner. The bearing blocks 30 each mount a bearing 31 therein to rotatably receive one of the shafts 20 or 21 therein. The spacing of the bearing blocks 30 is adjusted to insure that the teeth on the rolls 15 and 16 properly mesh.

The driven end bearing assembly 12 has a dual bearing block 32 that mounts a pair of the bearings 31 best seen in FIG. 3 therein at the proper spacing to maintain during engagement of the roll teeth in combination with the drive end bearing assembly 24. The bearing block 32 defines a pair of recesses 34 therein in registration with the bearings 31 that open onto that side of the block 32 facing the rolls 15 and 16. The recesses 34 receive the teeth 18 on the ends of the rolls 15 and 16 therein. The recesses 34 have a diameter $d_{RR}$ sufficient to give a running clearance with the teeth 18 and a depth $d_{RD}$ sufficient for the ends of the teeth 18 to be covered by the bearing block 32. While different dimensions may be used, a diameter $d_{RR}$ about 0.025 inch larger than the teeth crest diameter $d_{TC}$ has been found satisfactory and a depth $d_{RD}$ of about 0.375 inch has been found satisfactory where the thrust flange 33 of the bearing 31 is recessed in the block 32 as seen in the drawings. It will be noted that the recesses 34 open into each other so that the teeth 18 on the rolls 15 and 16 can mesh. Thus, the bearing block 32 covers the ends of the teeth on the rolls 15 and 16 to prevent a buildup of the material removed from the portion carried on top of the rolls around the ends of the rolls that causes binding as was encountered in the prior art.

Figure 4:
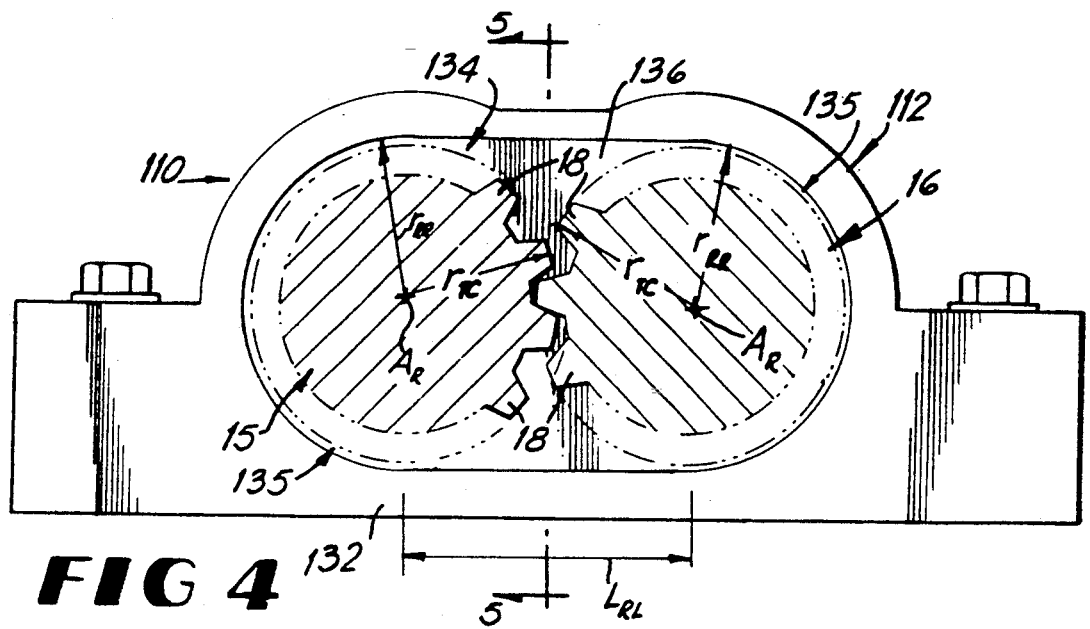
FIG. 4 is an enlarged cross-sectional view similar to FIG. 2 showing a second embodiment of the invention.
Figure 5:
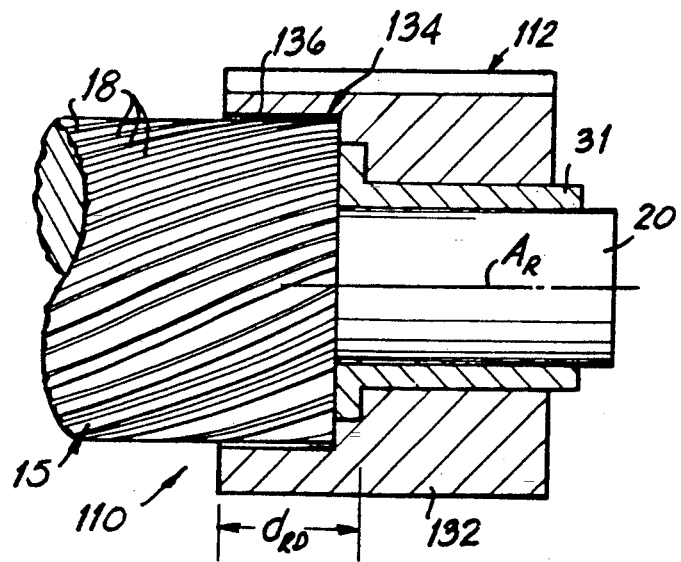
FIG. 5 is an enlarged cross-sectional view similar to FIG. 3 taken along line 5—5 in FIG. 4 showing the second embodiment of the invention.

FIGS. 4 and 5 illustrate a second embodiment of the invention which has been designated by the reference number 110. The difference between this embodiment of the invention and the first embodiment is the recess 134 in the discharge end bearing block 132. The common components of the first and second embodiments have the same reference numbers applied thereto.

The recess 134 is a single recess which extends around the discharge ends of both rolls 14 and 15. The recess 134 has semicircular ends 135 which have a radius $r_{RR}$ that is slightly longer than the thread crest radius $r_{TC}$ to provide a running clearance. While this clearance may vary, it has been found that a radius $r_{RR}$ about 0.010–0.015 inch greater than the radius $r_{TC}$ works exceptionally well. The semicircular ends 135 are joined by a straight section 136 which has a height $h_{RH}$ about equal to twice the radius $r_{RR}$. The length $L_{RL}$ of the straight section 136 is about equal to the distance between the roll axes $A_R$ so that the teeth drivingly intermesh. The depth $d_{RD}$ of the recess 134 is about the same as the first embodiment.

Figure 6:
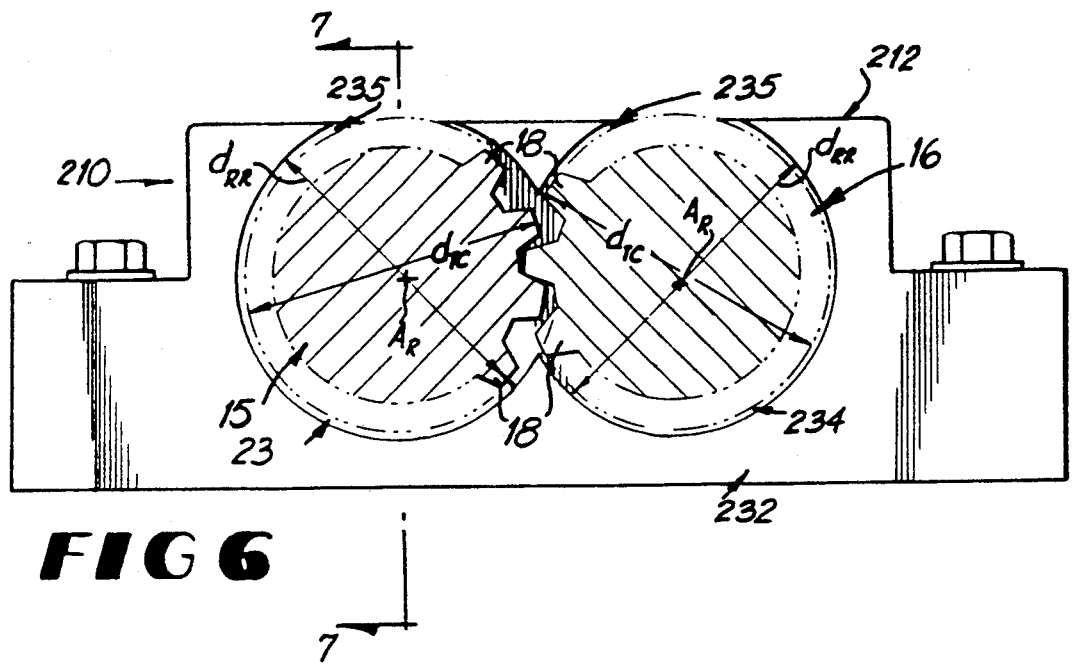
FIG. 6 is an enlarged cross-sectional view similar to FIG. 2 showing a third embodiment of the invention; and, FIG. 7 is an enlarged cross-sectional view similar to FIG. 3 taken along line 7—7 in FIG. 6 and showing the third embodiment of the invention.
Figure 7:
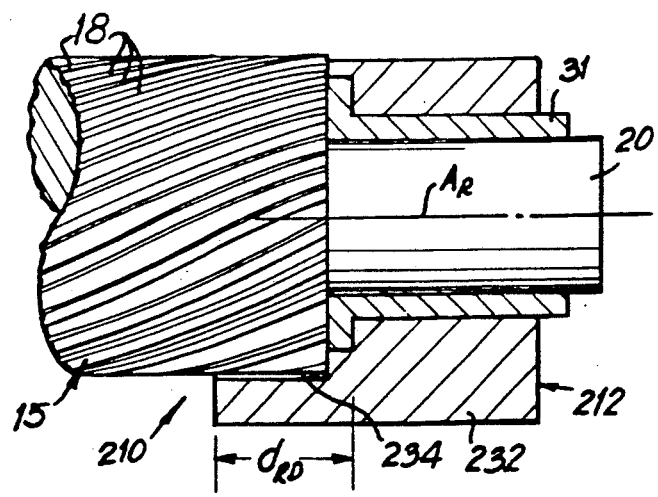

FIGS. 6 and 7 illustrate a third embodiment of the invention which has been designated by the reference number 210. The difference between this embodiment of the invention and the first embodiment is the recesses 234 in the discharge end bearing block 232. The common components of the first and second embodiments have the same reference numbers applied thereto.

Each of the recesses 234 corresponds generally in size and shape to the recesses 34 in the first embodiment of the invention. The top of the bearing block 232 has been cut away so that each of the recesses 234 opens onto the top of the block 232 as indicated at 235. This exposes the tops of the rolls 14 and 15 to facilitate the release of that portion of the poultry carried on top of the rolls 14 and 15.

It will be appreciated that the recesses into which the discharge ends of the rolls 14 and 15 fit may be formed as a separate cover without departing from the scope of the invention. A means should be provided to maintain the rolls centered in the recesses so that wear is minimized.

What is claimed as my invention is:

1. A processing assembly for use in processing poultry parts by separating the parts into different portions comprising:
    A) an elongate roll defining a plurality of helically extending teeth thereon adapted to grip and pull one portion of the poultry part off of the other, said roll having opposite toothed ends thereon, one end of which is the discharge end; and,
    B) cover means for at least partially covering the discharge end of said roll, said means defining a recess therein for the discharge end of said roll, said recess having a size such that the discharge end of said roll is rotatably received therein and a depth such that the teeth on the discharge end of said roll extend a prescribed distance into said recess.

2. The processing assembly of claim 1
including a pair of said toothed rolls, said teeth on said rolls drivingly intermeshing with each other; and,
said cover means defining a pair of said recesses therein, each recess receiving the discharge end of one of said rolls therein, said pair of recesses opening into each other to permit said teeth on said rolls to intermesh in said recesses.

3. The processing assembly of claim 2 wherein said cover means defines a top surface thereon and wherein said recesses each open onto said top surface so that the teeth on said rolls are exposed through said top surface.

4. The processing assembly of claim 1
including a pair of said toothed rolls, said teeth on said rolls drivingly intermeshing with each other; and,
said cover means defining a single recess therein receiving the discharge ends of both of said rolls therein, said recess having ends conforming to a portion of the discharge ends of said rolls to permit said teeth on said rolls to intermesh in said recess.

5. The processing assembly of claim 1 wherein said elongate roll further includes:
a support shaft on each end thereof extending outwardly along the central axis of said roll; and,
wherein said cover means further includes:
mounting means for rotatably mounting said support shaft on the discharge end of said roll to maintain said toothed end of said roll located in said recess.

6. The processing assembly of claim 5 wherein said mounting means includes:
a bearing block defining a passage therethrough; and,
a sleeve bearing mounted therein rotatably mounting said support shaft therein.

7. The processing assembly of claim 2 wherein each of said elongate rolls further includes:
   a support shaft on each end thereof extending outwardly along the central axis of said roll; and,
wherein said cover means further includes:
   mounting means for rotatably mounting said support shafts on the discharge ends of both of said rolls to maintain said toothed ends of said rolls located in said recesses.

8. The processing assembly of claim 7 wherein said mounting means includes:
   a bearing block defining a pair of passages therethrough; and,
   a sleeve bearing mounted in each of said passages rotatably mounting one of said support shafts on the discharge ends of said rolls therein.

9. The processing assembly of claim 8
wherein each of said sleeve bearings includes a thrust flange on the end thereof facing the teeth on said rolls; and,
   wherein said bearing block further defines a counterbore about each of said passages receiving said thrust flanges on said sleeve bearings therein so that said thrust flanges are about flush with the bottom of said recesses.

10. A cover for use with a pair of toothed rolls used in poultry processing where the rolls have opposed toothed ends thereon and where one set of the ends of the rolls are the discharge ends from which the poultry part being processed is discharged, said cover comprising:
   cover means for at least partially covering the discharge ends of said rolls, said means defining a recess therein for the discharge ends of said rolls, said recess having a size such that the discharge ends of said rolls are rotatably received therein and a depth such that the teeth on the discharge ends of said rolls extend a prescribed distance into said recess.

11. The cover of claim 10 wherein
said cover means defines a pair of said recesses therein, each recess receiving the discharge end of one of said rolls therein, said pair of recesses opening into each other to permit said teeth on said rolls to intermesh in said recesses.

12. A mounting adapted to rotatably mount a pair of toothed rolls used in poultry processing therein where the rolls have opposed toothed ends thereon and a support shaft projecting from each toothed end of each roll and where one set of the ends of the rolls are the discharge ends from which the poultry part being processed is discharged, said mounting comprising:
   a bearing block assembly defining a pair of recesses therein, each recess having a size such that the discharge end of one of the rolls is rotatably received therein and a depth such that the teeth on the discharge end of the roll extend a prescribed distance into said recess, said pair of recesses opening into each other to permit the teeth on the rolls to intermesh in said recesses.

* * * * *